US007672916B2

(12) United States Patent
Poliner et al.

(10) Patent No.: US 7,672,916 B2
(45) Date of Patent: Mar. 2, 2010

(54) METHODS, SYSTEMS, AND MEDIA FOR MUSIC CLASSIFICATION

(75) Inventors: Graham E. Poliner, Merritt Island, FL (US); Michael I. Mandel, Conshohocken, PA (US); Daniel P. W. Ellis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 632 days.

(21) Appl. No.: 11/505,687

(22) Filed: Aug. 16, 2006

(65) Prior Publication Data

US 2008/0022844 A1 Jan. 31, 2008

Related U.S. Application Data

(60) Provisional application No. 60/708,664, filed on Aug. 16, 2005.

(51) Int. Cl.
*G06E 1/00* (2006.01)
*G06E 3/00* (2006.01)
*G06F 15/18* (2006.01)
*G06G 7/00* (2006.01)

(52) U.S. Cl. .......................................................... 706/20

(58) Field of Classification Search .................... 706/20
See application file for complete search history.

(56) References Cited

U.S. PATENT DOCUMENTS 7,091,409 B2 * 8/2006 Li et al. ......................... 84/634
7,348,184 B2 * 3/2008 Rich et al. ................... 436/518
7,363,279 B2 * 4/2008 Ma et al. ....................... 706/12
7,366,325 B2 * 4/2008 Fujimura et al. ............ 382/104
7,444,018 B2 * 10/2008 Qi et al. ....................... 382/170
7,461,048 B2 * 12/2008 Teverovskiy et al. .......... 706/62
7,467,119 B2 * 12/2008 Saidi et al. ..................... 706/21
7,480,639 B2 * 1/2009 Bi ................................ 706/12
7,483,554 B2 * 1/2009 Kotsianti et al. ............ 382/128
7,487,151 B2 * 2/2009 Yamamoto ...................... 707/7
7,510,842 B2 * 3/2009 Podust et al. ................ 435/7.1
7,519,994 B2 * 4/2009 Judge et al. .................... 726/22
7,548,936 B2 * 6/2009 Liu et al. ................. 707/104.1
7,561,741 B2 * 7/2009 Song et al. .................. 382/190

OTHER PUBLICATIONS

Research on target classification for SAR images based on C-Means and support vector machines Yuan Lihai; Song Jianshe; Ge Jialong; Jiang Kai; Industrial Electronics and Applications, 2009. ICIEA 2009. 4th IEEE Conference on May 25-27, 2009 pp. 1592-1596 Digital Object Identifier 10.1109/ICIEA.2009.5138463.*

EEG signal classification during listening to native and foreign languages songs Shao-Jie Shi; Bao-Liang Lu; Neural Engineering, 2009. NER '09. 4th International IEEE/EMBS Conference on Apr. 29, 2009-May 2, 2009 pp. 440-443 Digital Object Identifier 10.1109/NER.2009.5109327.*

(Continued)

*Primary Examiner*—Michael B Holmes
(74) *Attorney, Agent, or Firm*—Wilmer Cutler Pickering Hale and Dorr LLP

(57) ABSTRACT

Methods, systems, and media are provided for classifying digital music. In some embodiments, methods of classifying a song are provided that include: receiving a selection of at least one seed song; receiving a label selection for at least one unlabeled song; training a support vector machine based on the at least one seed song and the label selection; and classifying a song using the support vector machine. In some embodiments, systems for classifying a song are provided that include: memory for storing at least one seed song, at least one unlabeled song, and a song; and a processor that: receives a selection of the at least one seed song; receives a label selection for the at least one unlabeled song; trains a support vector machine based on the at least one seed song and the label selection; and classifies the song using the support vector machine.

51 Claims, 11 Drawing Sheets

OTHER PUBLICATIONS

A Specific Target Track Method Based on SVM and AdaBoost Huajun Song; Mei-Ii Shen; Computer Science and Computational Technology, 2008. ISCSCT '08. International Symposium on vol. 1, Dec. 20-22, 2008 pp. 360-363 Digital Object Identifier 10.1109/ISCSCT.2008.13.*

Artist detection in music with Minnowmatch Whitman, B.; Flake, G.; Lawrence, S.; Neural Networks for Signal Processing XI, 2001. Proceedings of the 2001 IEEE Signal Processing Society Workshop Sep. 10-12, 2001 pp. 559-568 Digital Object Identifier 10.1109/NNSP.2001.943160.*

* cited by examiner 104 100 106 102

| GMM over | Feature | Parameters | Representation | Distance measure $D^2(\mathbf{X}_i, \mathbf{X}_j)$ |
|---|---|---|---|---|
| | MFCC Stats | 104 | $[\mu^T \ \mathrm{vec}(\Sigma)^T]$ | $(\mu_i - \mu_j)^T \Sigma_\mu^{-1} (\mu_i - \mu_j) + \mathrm{vec}(\Sigma_i - \Sigma_j)^T \Sigma_\Sigma^{-1} \mathrm{vec}(\Sigma_i - \Sigma_j)$ |
| Song | KL 1G | 104 | $\mu, \Sigma$ | $tr(\Sigma_i^{-1}\Sigma_j + \Sigma_j^{-1}\Sigma_i) + (\mu_i - \mu_j)^T(\Sigma_i^{-1} + \Sigma_j^{-1})(\mu_i - \mu_j) - 2d$ |
| | KL 20G | 520 | $\{\mu_k, \Sigma_k\}_{k=1...20}$ | $\frac{1}{N}\sum_{n=1}^{N} \log \frac{p_i(\mathbf{x}_{ni})}{p_j(\mathbf{x}_{ni})} + \frac{1}{N}\sum_{n=1}^{N} \log \frac{p_j(\mathbf{x}_{nj})}{p_i(\mathbf{x}_{nj})}$ |
| | GMM Posteriors | 100 | $\{\frac{1}{T}\sum_{t=1}^{T} \log p(k \mid \mathbf{x}_t)\}_{k=1...50}$ | $\sum_{k=1}^{50} \log^2 \frac{p(X_i \mid k)^{1/T_i}}{p(X_j \mid k)^{1/T_j}}$ |
| Corpus | Fisher | 650 | $\{\nabla_{\mu_k}\}_{k=1...50}$ | $\sum_{k=1}^{50} [\nabla_{\mu_k} \log p(\mathbf{X}_i \mid \mu_k) - \nabla_{\mu_k} \log p(\mathbf{X}_j \mid \mu_k)]^2$ |
| | Fisher Mag | 50 | $\{\lvert\nabla_{\mu_k}\rvert\}_{k=1...50}$ | $\sum_{k=1}^{50} [\lvert\nabla_{\mu_k} \log p(\mathbf{X}_i \mid \mu_k)\rvert - \lvert\nabla_{\mu_k} \log p(\mathbf{X}_j \mid \mu_k)\rvert]^2$ |

FIG. 1

| Artist | Training | Testing | Validation |
|---|---|---|---|
| Aerosmith | A Little South of Sanity D1, Nine Lives, Toys in the Attic | A Little South of Sanity D2, Live Bootleg | |
| Beatles | Abbey Road, Beatles for Sale, Magical Mystery Tour | 1, A Hard Day's Night | Revolver |
| Bryan Adams | Live Live Live, Reckless, So Far So Good | On a Day Like Today, Waking Up the Neighbors | |
| Creedence Clearwater Revival | Live in Europe, The Concert, Willy and the Poor Boys | Cosmo's Factory, Pendulum | |
| Dave Matthews Band | Live at Red Rocks D1, Remember Two Things, Under the Table and Dreaming | Before These Crowded Streets, Live at Red Rocks D2 | Crash |
| Depeche Mode | Music for the Masses, Some Great Reward, Ultra | Black Celebration, People are People | Violator |
| Fleetwood Mac | London Live '68, Tango in the Night, The Dance | Fleetwood Mac, Rumours | |
| Garth Brooks | Fresh Horses, No Fences, Ropin' the Wind | In Pieces, The Chase | Garth Brooks |
| Genesis | From Genesis to Revelations, Genesis, Live: The Way We Walk Vol 1 | Invisible Touch, We Can't Dance | |
| Green Day | Dookie, Nimrod, Warning | Insomniac, Kerplunk | |
| Madonna | Music, You Can Dance, I'm Breathless | Bedtime Stories, Erotica | Like A Prayer |
| Metallica | Live Shit: Binge and Purge D1, Reload, S&M D1 | Live Shit: Binge and Purge D3, Load | S&M D2 |
| Pink Floyd | Dark Side of the Moon, Pulse D1, Wish You Were Here | Delicate Sound of Thunder D2, The Wall D2 | The Wall D1 |
| Queen | Live Magic, News of the World, Sheer Heart Attack | A Kind of Magic, A Night at the Opera | Live Killers D1 |
| Rolling Stones | Get Yer Ya-Ya's Out, Got Live if You Want It, Some Girls | Still Life: American Concert 1981, Tattoo You | |
| Roxette | Joyride, Look Sharp, Tourism | Pearls of Passion, Room Service | |
| Tina Turner | Live in Europe D1, Twenty Four Seven, Wildest Dreams | Private Dancer, Live in Europe D2 | |
| U2 | All That You Can't Leave Behind, Rattle and Hum, Under a Blood Red Sky | The Joshua Tree, The Unforgettable Fire | Zooropa |

FIG. 4

| Mood | Songs | Style | Songs |
| --- | --- | --- | --- |
| Rousing | 527 | Pop/Rock | 730 |
| Energetic | 387 | Album Rock | 466 |
| Playful | 381 | Hard Rock | 323 |
| Fun | 378 | Adult Contemporary | 246 |
| Passionate | 364 | Rock & Roll | 226 |

FIG. 5

Express Mail label No. EV 842148344 US
Date of Deposit: 8/16/06
Atty. Docket No. 19240.413

| Ground Truth | 2 Ex/R | 5 Ex/R | 10 Ex/R | 20 Ex/R | Conv. |
|---|---|---|---|---|---|
| Style | .683 | .671 | .663 | .641 | .587 |
| Artist | .624 | .629 | .603 | .583 | .501 |
| Mood | .478 | .465 | .447 | .435 | .412 |

FIG. 7

METHODS, SYSTEMS, AND MEDIA FOR MUSIC CLASSIFICATION

CROSS-REFERENCE TO RELATED APPLICATION

This application claims the benefit under 35 U.S.C. § 119(e) of U.S. Provisional Patent Application No. 60/708,664 filed Aug. 16, 2005, which is hereby incorporated by reference herein in its entirety.

STATEMENT REGARDING GOVERNMENT SPONSORED RESEARCH

The invention disclosed herein was made with U.S. Government support from the National Science Foundation grant IIS-0238301. Accordingly, the U.S. Government may have certain rights in this invention.

FIELD OF THE INVENTION

The disclosed subject matter relates to classification of digital music collections using a computational model of music similarity.

BACKGROUND

The sizes of personal digital music collections are constantly growing. Users of digital music are finding choosing music appropriate to a particular situation increasingly difficult. Furthermore, finding music that users would like to listen to from a personal collection or an online music store is also a difficult task. Since finding songs that are similar to each other is time consuming and each user has unique opinions, a need exists to create perform music classification in a machine.

SUMMARY OF THE INVENTION

Methods, systems, and media are provided for classifying digital music.

In some embodiments, methods of classifying a song are provided that include: receiving a selection of at least one seed song; receiving a label selection for at least one unlabeled song; training a support vector machine based on the at least one seed song and the label selection; and classifying a song using the support vector machine.

In some embodiments, systems for classifying a song are provided that include: memory for storing at least one seed song, at least one unlabeled song, and a song; and a processor that: receives a selection of the at least one seed song; receiving a label selection for the at least one unlabeled song; trains a support vector machine based on the at least one seed song and the label selection; and classifies the song using the support vector machine.

In some embodiments, computer-readable media containing computer-executable instructions that, when executed by a computer, cause the computer to perform a method for classifying music, wherein the method includes: receiving a selection of at least one seed song; receiving a label selection for at least one unlabeled song; training a support vector machine to based on the at least one seed song and the label selection; and classifying a song using the support vector machine.

BRIEF DESCRIPTION OF DRAWINGS

Various objects, features, and advantages of the disclosed subject matter can be more fully appreciated with reference to the following detailed description when considered in connection with the following drawings.

FIG. 1 illustratively displays a list of features that can be used to classify music in accordance with some embodiments of the disclosed subject matter.

FIG. 4 illustrates a list of artists and albums used in training, testing, and validation in an experiment performed on some embodiments of the disclosed subject matter.

FIG. 5 illustrates a list of moods and styles, and corresponding songs, in a database used in an experiment performed on some embodiments of the disclosed subject matter.

FIGS. *6a-b* illustrate results of an experiment performed on some embodiments of the disclosed subject matter.

FIG. 7 illustrates additional results of an experiment performed on some embodiments of the disclosed subject matter.

Figure 8:
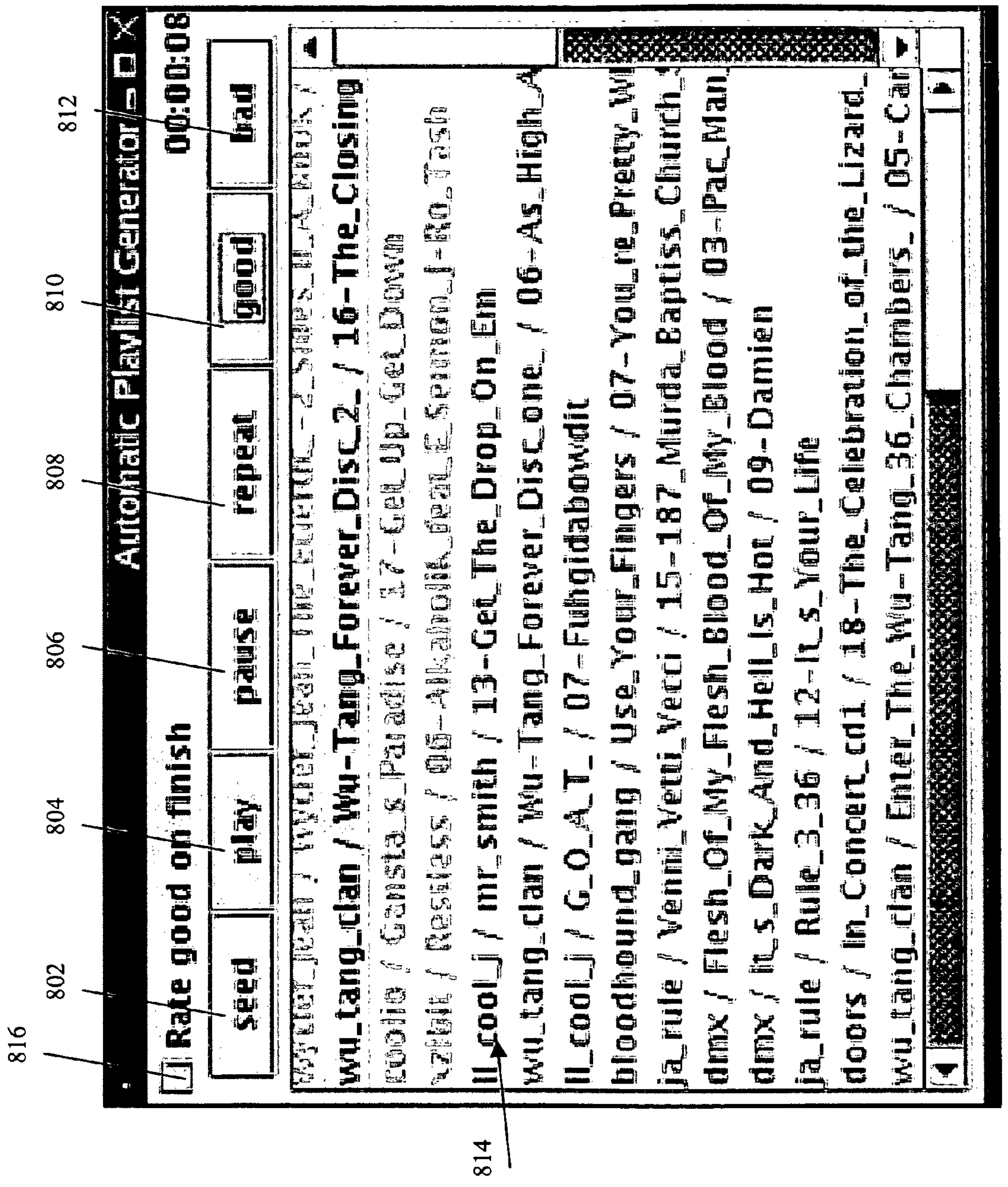

FIG. 8 illustratively displays another user interface for classifying music in accordance with some embodiments of the disclosed subject matter.

Figure 9:
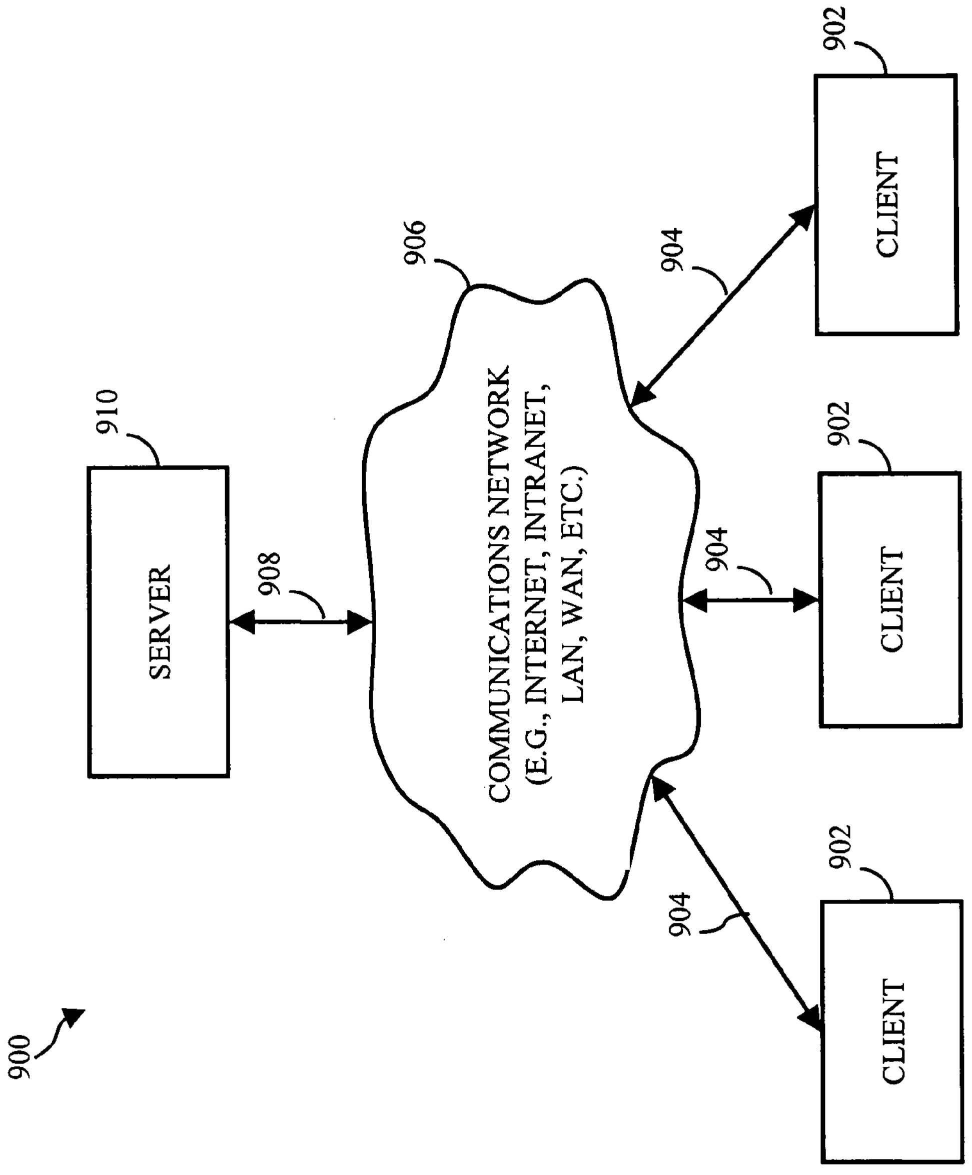

FIG. 9 illustratively displays a block diagram a various hardware components in a system in accordance with some embodiments of the disclosed subject matter.

DETAILED DESCRIPTION

Methods, systems, and computer readable media for classifying music are described. In some embodiments Support Vector Machines (SVMs) can be used to classify music. In certain of these embodiments, relevance feedback such as SVM active learning can be used to classify music. Log-frequency cepstral statistics, such as Mel-Frequency Cepstral Coefficient statistics, can also be used to classify music.

Digital music is available in a wide variety of formats. Such formats include MP3 files, WMA files, streaming media, satellite and terrestrial broadcasts, Internet transmission, fixed media, such as CD and DVD, etc. Digital music can also be formed from analog signals using well-known techniques. A song, as that term is used in the specification and claims may be any form of music including complete songs, partial songs, musical sound clips, etc.

Generally speaking, an SVM is a supervised classification system that minimizes an upper bound on an expected error of the SVM. An SVM attempts to find a hyperplane separating two classes of data that will generalize best fit of future data. Such a hyperplane is the so-called maximum margin hyperplane, which maximizes the distance to the closest point from each class.

Given data points $\{X_0, \ldots, X_N\}$ and class labels $\{y_0, \ldots, y_N\}$, $y_i \in \{-1,1\}$, any hyperplane separating the two data classes has the form:

$$y_i(w^T X_i + b) > 0 \ \forall_i \tag{1}$$

Let $\{w_k\}$ be the set of all such hyperplanes. The maximum margin hyperplane is defined by $$w = \sum_{i=0}^{N} \alpha_i y_i X_i \tag{2}$$

and b is set by the Karush Kuhn Tucker conditions where the $\{\alpha_0, \alpha_1, \ldots, \alpha_N\}$ maximize $$L_D = \sum_{i=0}^{N} \alpha_i - \frac{1}{2} \sum_{i=0}^{N} \sum_{j=0}^{N} \alpha_i \alpha_j y_i y_j X_i^T X_j \tag{3}$$

subject to $$\sum_{i=0}^{N} \alpha_i y_i = 0 \tag{4}$$

$$\alpha_i \geq 0 \forall\, i$$

For linearly separable data, only a subset of the $\alpha_i$s will be non-zero. These points are called the support vectors and all classification performed by the SVM depends on only these points and no others. Thus, an identical SVM would result from a training set that omitted all of the remaining examples. This makes SVMs an attractive complement to relevance feedback: if the feedback system can accurately identify the critical samples that will become the support vectors, training time and labeling effort can, in the best case, be reduced drastically with no impact on classifier accuracy.

Since the data points X only enter calculations via dot products, one can transform them to another feature space via a function $\Phi(X)$. The representation of the data in this feature space need never be explicitly calculated if there is an appropriate Mercer kernel operator for which $$K(X_i, X_j) = \Phi(X_i) \cdot \Phi(X_j) \tag{5}$$

Data that is not linearly separable in the original space, may become separable in this feature space. In our implementation, we select a radial basis function (RBF) kernel $$K(X_i, X_j) = e^{-\gamma D^2(X_i, X_j)} \tag{6}$$

where $D^2(Xi,Xj)$ could be any distance function. See FIG. 1 for a list of the distance functions that may be used in various embodiments.

As set forth above, SVM can be used with active learning in certain embodiment. In active learning, the user can become an integral part of the learning and classification process. As opposed to conventional ("passive") SVM classification where a classifier is trained on a large pool of randomly selected labeled data, in an active learning system the user is asked to label only those instances that would be most informative to classification. Learning proceeds based on the feedback from the user and relevant responses are determined by the individual user's preferences and interpretations.

The duality between points and hyperplanes in feature space and parameter space enables SVM active learning. Notice that Eq. (1) can be interpreted with Xi as points and $w_k$ as the normals of hyperplanes, but it can also be interpreted with $w_k$ as points and Xi as normals. This second interpretation of the equation is known as parameter space. Within parameter space, the set $\{w_k\}$ is known as version space, a convex region bounded by the hyperplanes defined by the Xi. Finding the maximum margin hyperplane in the original space is equivalent to finding the point at the center of the largest hypersphere in version space.

The user's desired classifier corresponds to a point in parameter space that the SVM active learning system attempts to locate as quickly as possible. Labeled data points place constraints in parameter space, reducing the size of the version space. The fastest way to shrink the version space is to halve it with each labeled example, finding the desired classifier most efficiently. When the version space is nearly spherical, the most informative point to label is that point closest to the center of the sphere, i.e., closest to the decision boundary. In pathological cases, this is not true, nor is it true that the greedy strategy of selecting more than one point closest to a single decision boundary shrinks the version space most quickly.

Angle diversity is one heuristic that may be used for finding the most informative points to label. Angle diversity typically balances the closeness to the decision boundary with coverage of the feature space, while avoiding extra classifier retrainings. In some cases, explicit enforcement of diversity may not be needed, for example when songs in the feature space are sparse.

In some instances, the first round of active learning can be treated as special. In such instances, the user only seeds the system with positive examples. Because of this, the first group of examples presented to the user by the system for labeling cannot be chosen by a classifier because the system cannot differentiate yet between positive and negative. Therefore, the first examples presented to the user for labeling can be chosen at random, with the expectation that since positive examples are relatively rare in the database, most of the randomly chosen examples will be negative. Additionally and/or alternatively, the first group of examples may be chosen so that they maximally cover the feature space, are farthest from the seed songs, are closest to the seed songs, or based upon any other suitable criteria or criterion. Further, in some embodiments, because features can be pre-computed, the group of songs can be the same for every query.

Various features of songs can be used by an SVM to classify those songs. In some embodiments, the features have the property that they reduce every song, regardless of its original length, into a fixed-size vector, and are based on Gaussian mixture models (GMMs) of Mel-Frequency Cepstral Coefficients (MFCCs).

Generally speaking, MFCCs are short-time spectral decompositions of audio signals that convey the general frequency characteristics important to human hearing. In some embodiments, to calculate MFCCs for a song, the song is first broken into overlapping frames, each for a given amount of time (e.g., approximately 25 ms long) and a time scale at which the signal can be assumed to be stationary. The log-magnitude of the discrete Fourier transform of each frame is then warped to the Mel frequency scale, imitating human frequency and amplitude sensitivity. Next, an inverse discrete cosine transform is used to decorrelate these "auditory spectra" and the so-called "high time" portion of the signal, corresponding to fine spectral detail, is discarded, leaving only the general spectral shape. In an example, MFCCs calculated for songs in a popular database can contain 13 coefficients each and, depending on the length of the song, approximately 30,000 temporal frames.

Although Mel scale is described herein as an example of a scale that could be used, it should be apparent that any other suitable scale could additionally or alternatively be used. For example, Bark scale, Erb scale, and Semitones scale could be used.

FIG. 1 is a summary of six illustrative features 100 of songs that may be used to classify them. As shown, each of these features can use its own distance function 102 in the RBF kernel of Eq. (6). Examples of the numbers of parameters 106 that can be used in each feature are also shown. As shown in column 104, the first three can use Gaussian models trained on individual songs, while the second three can relate each song to a global Gaussian mixture model of the entire corpus.

All of these approaches can model stationary spectral characteristics of music, averaged across time, and ignore the higher-order temporal structure. Of course, other features, and variations on these features can also be used.

In the illustrative explanation set forth below, X denotes matrices of MFCCs, $x_t$ denotes individual MFCC frames, songs are indexed by i and j, GMM components are indexed by k, MFCC frames are indexed in time by t, and MFCC frames drawn from a probability distribution are indexed by n.

MFCC Statistics

This first feature listed in FIG. 1 is based on the mean and covariance of the MFCC frames of individual songs. This feature can model a song as just a single Gaussian, but use a non-probabilistic distance measure between songs. The feature can be the concatenation of the mean and the unwrapped covariance matrix of a song's MFCC frames.

The feature vector is shown in FIG. 1, where the vec(·) function unwraps or rasterizes an N×N matrix into a $N^2 \times 1$ vector. These feature vectors can be compared to one another using a Mahalanobis distance or any other suitable metric, where the $\Sigma_\mu$ and $\Sigma_\Sigma$ variables are diagonal matrices containing the means and variances of the feature vectors over all of the songs.

Song GMMs

The second feature listed in FIG. 1 can model songs as single Gaussians. The maximum likelihood Gaussian describing the MFCC frames of a song can be parameterized by the sample mean and sample covariance. To measure the distance between two songs using this feature, one can calculate the Kullback-Leibler (KL) divergence between the two Gaussians. While the KL divergence is not a true distance measure, the symmetrized KL divergence is, and can be used in the RBF kernel of Eq. (6).

For two distributions, p(x) and q(x), the KL divergences is defined as, $$KL(p\|q) \equiv \int p(x)\log\frac{p(x)}{q(x)}dx = E_p\left\{\log\frac{p(X)}{q(X)}\right\}. \tag{7}$$

There is a closed form for the KL divergence between two Gaussians, $$p(x) = \mathcal{N}(x; \mu_p, \Sigma_p) \text{ and } q(x) = \mathcal{N}(x; \mu_q, \Sigma_q), \tag{8}$$

$$2KL(p\|q) = \log\frac{|\Sigma_q|}{|\Sigma_p|} + Tr(\Sigma_q^{-1}\Sigma_p) + (\mu_p - \mu_q)^T\Sigma_q^{-1}(\mu_p - \mu_q) - d,$$

where d is the dimensionality of the Gaussians. The symmetrized KL divergence shown in FIG. 1 is simply $$D^2(X_i, X_j) = KL(X_i\|X_j) + KL(X_j\|X_i) \tag{9}$$

The third feature listed in FIG. 1 can be used to models songs as mixture of Gaussians learned using the expectation maximization (EM) algorithm and still compare them using the KL divergence. Although there is no closed form for the KL divergence between GMMs, the KL divergence can be approximated using Monte Carlo methods. The expectation of a function over a distribution, p(x), can be approximated by drawing samples from p(x) and averaging the values of the function at those points. In this case, by drawing samples $x_1, \ldots, x_N \sim p(x)$, we can approximate $$E_p\left\{\log\frac{p(x)}{q(x)}\right\} \approx \frac{1}{N}\sum_{i=1}^{N}\log\frac{p(x_i)}{q(x_i)} \tag{10}$$

The distance function shown in FIG. 1 for the "KL 20G" features is the symmetric version of this expectation, where appropriate functions are calculated over N samples from each distribution. The Kernel Density Estimation toolbox available from http://ssg.mit.edu/~ihler/code/ can be used for these calculations. As the number of samples used for each calculation grows, variance of the KL divergence estimate shrinks. N=2500 samples can be used for each distance estimate to balance computation time and accuracy.

Anchor Posteriors

The fourth feature listed in FIG. 1 can be used to compare each song to the GMM modeling our entire music corpus. If the Gaussians of the global GMM correspond to clusters of related sounds, a song can be characterized by the probability that it came from each of these clusters. This feature corresponds to measuring the posterior probability of each Gaussian in the mixture, given the frames from each song. To calculate the posterior over the whole song from the posteriors for each frame, $$P(k \mid X) \propto p(X \mid k)P(k) = P(k)\prod_{t=1}^{T} p(x_t \mid k) \tag{11}$$

This feature tends to saturate, generating a non-zero posterior for only a single Gaussian. In order to prevent this saturation, the geometric mean of the frame probabilities can be taken instead of the product. This provides a "softened" version of the true class posteriors.

$$f(k) = P(k)\prod_{t=1}^{T} p(x_t \mid k)^{1/T} \propto \prod_{t=1}^{T} p(k \mid x_t)^{1/T} \tag{12}$$

These geometric means can be compared using Euclidean distance.

Fisher Kernel

The fifth feature listed in FIG. 1 is based on the Fisher kernel, which is a method for summarizing the influence of the parameters of a generative model on a collection of samples from that model. In some instances, the feature considered is the means of the Gaussians in the global GMM. This feature describes each song by the partial derivatives of the log likelihood of the song with respect to each Gaussian mean. The feature can be described in equation form as:

$$\nabla_{\mu_k} \log P(X \mid \mu_k) = \sum_{t=1}^{T} P(k \mid x_t)\Sigma_k^{-1}(x_t - \mu_k) \tag{13}$$

where $P(k|x_t)$ is the posterior probability of the kth Gaussian in the mixture given MFCC frame $x_t$, and $\mu_k$ and $\Sigma_k$ are the mean and variance of the kth Gaussian. Using this approach can reduce arbitrarily sized songs to 650 dimensional features (i.e., 50 means with 13 dimensions each), for example.

Since the Fisher kernel is a gradient, it measures the partial derivative with respect to changes in each dimension of each Gaussian's mean. The sixth feature listed in FIG. 1 is more compact feature based on the Fisher kernel that takes the magnitude of the gradient measured by the Fisher kernel with respect to each Gaussian's mean. While the full Fisher kernel creates a 650 dimensional vector, the Fisher kernel magnitude is only 50 dimensional.

Figure 2:
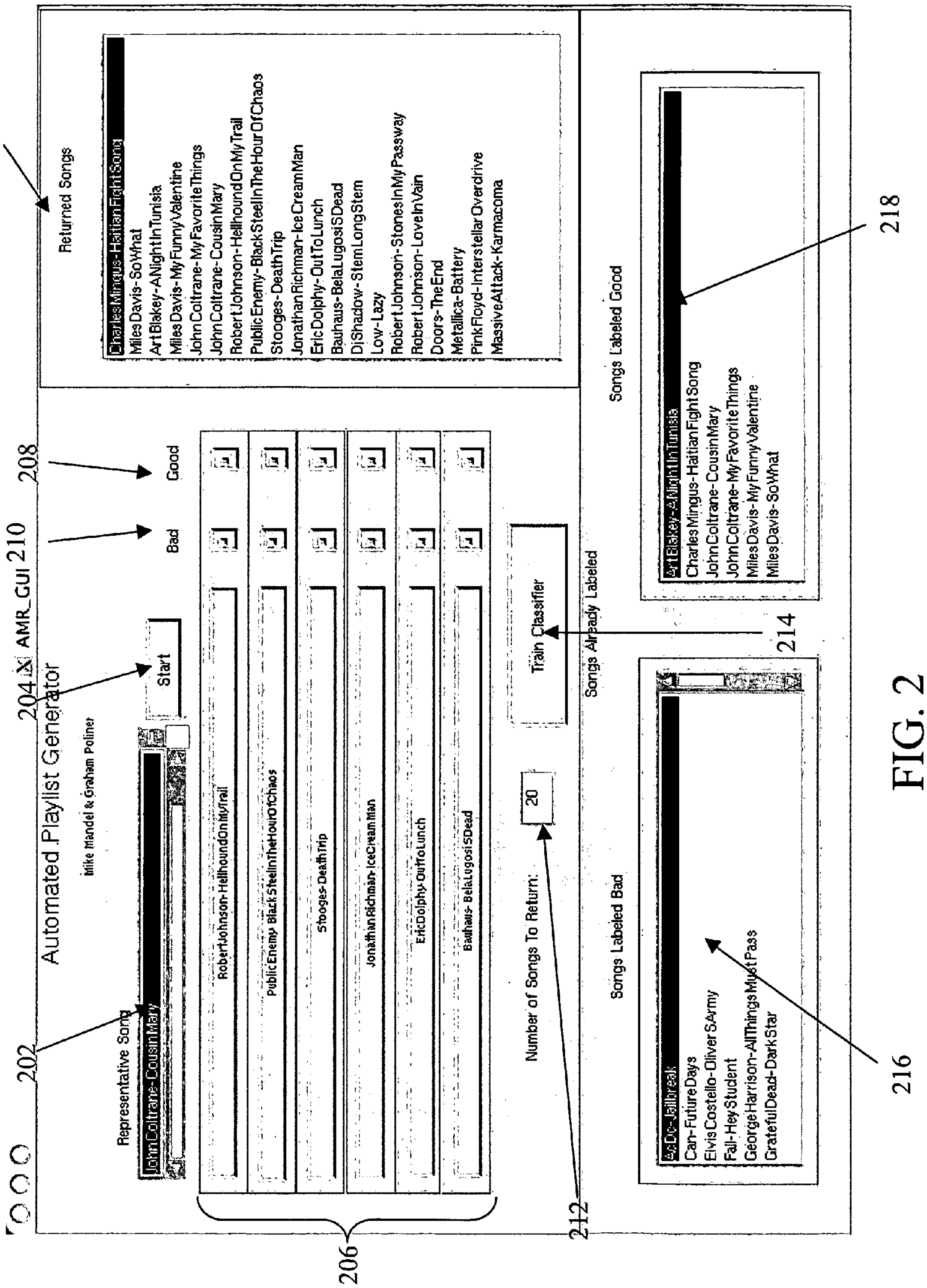
FIG. 2 illustratively displays a graphical user interface for classifying music in accordance with some embodiments of the disclosed subject matter.

In some instances, referring to FIG. 2, users can utilize a graphical user interface to interact with the system in real time with real queries. For example, users can search for categories (e.g., jazz, rap, rock, punk, female vocalists, fast, etc.) to find music they prefer.

For example, the user can enter a representative seed song 202 (e.g., John Coltrane-Cousin Mary) and begin the active retrieval system by selecting start 204. The system can then present a number of songs 206 (e.g., six songs). The user can then select to label songs as good, bad, or unlabeled. In order to select whether a song is good or bad, radio buttons 208 and 210 corresponding to good and bad for the song can be selected. Next, the user can select the number of songs to return in box 212 and begin the classification process by selecting train classifier button 214. Labeled songs can then be displayed at the bottom of the interface (i.e., songs labeled bad can be shown in box 216 and songs labeled good can be shown in box 218), and songs returned by the classifier can be displayed in list 220.

In some instances, the user can click on a song displayed in the interface to hear a representative segment of that song. After each classification round, the user can be presented with a number of new songs (e.g., six new songs) to label and can perform the process iteratively as many times as desired. Further, in some instances the user does not enter representative song 202, but rather the user relies solely on songs presented by the system for labeling.

Figure 3:
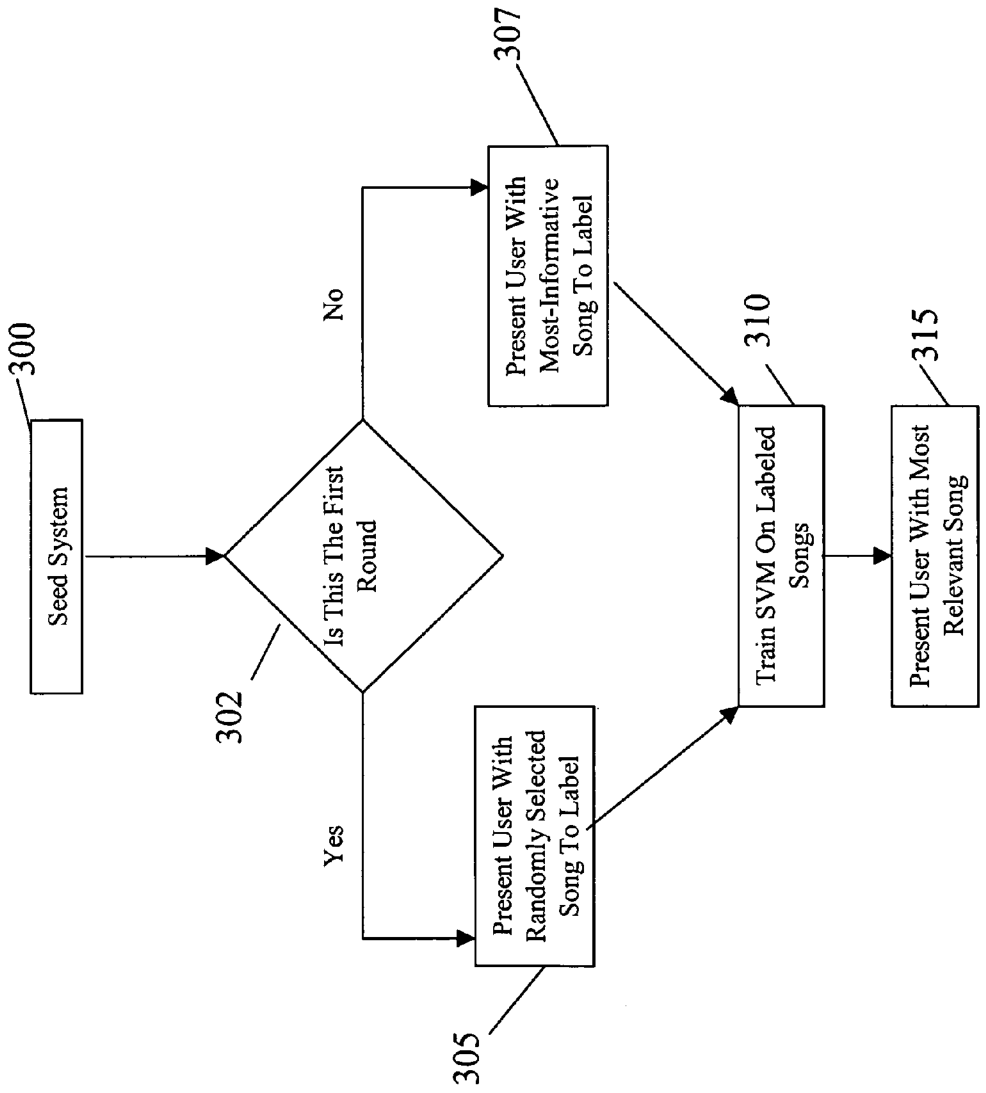
FIG. 3 illustratively displays a process for classifying music in accordance with some embodiments of the disclosed subject matter.

FIG. 3 illustrates a process for classifying music in accordance with certain embodiments. As illustrated, the user initially seeds the system with one or more representative songs at 100. This may be performing in any suitable way, such as selecting the songs from a menu, typing-in the names of songs, etc. At 102, a determination is made as to whether this is the first feedback round. If this is the first feedback round, the user is presented with one or more randomly selected songs to label at 105. Although illustrated as being selected randomly, in some embodiments, such songs could be selected pseudo-randomly, accordingly to a predetermined mechanism, or in any suitable manner. If this is not the first feedback round, the user is presented with one or more of the most informative songs to label (e.g., those closest to the decision boundary) at 107. Which songs are the most informative can be determined in any suitable manner as described above. For example, the songs closest to the boundary of the classifier (as described above) could be selected. After 105 or 107, the SVM trains on labeled instances at 110. At 115, the user is presented with one or more of the most relevant songs, for example by a list being presented on a display. It will be apparent that each of the aforementioned steps can be further separated or combined.

Experiment

In order to test the SVM active music retrieval system, the SVM parameters, features, and the number of training examples were varied per active retrieval round.

The experiment was run on a subset of a database of popular music. To avoid the so called "producer effect" in which songs from the same album share overall spectral characteristics that could swamp any similarities between albums, artists were selected who had enough albums in the database to designate entire albums as training, testing, or validation. Such a division required each artist to have three albums for training and two for testing, each with at least eight tracks to get enough data points per album. The validation set was made up of any albums the selected artists had in the database in addition to those five. In total there were 18 artists (out of 400) who met these criteria. Referring to FIG. 4, a complete list of the artists and albums included in the experiment is displayed. In total, 90 albums by 18 artists, which contained a total of 1,210 songs divided into 656 training, 451 testing, and 103 validation songs, were used Since a goal of SVM active learning is to quickly learn an arbitrary classification task, any categorization of the data points can be used as ground truth for testing. In the experiment, music was classified by All Music Guide (AMG) moods, AMG styles, and artist. AMG is a website (www.allmusic.com) and book that reviews, rates, and categorizes music and musicians. Two ground truth datasets were AMG "moods" and "styles." In its glossary, AMG defines moods as "adjectives that describe the sound and feel of a song, album, or overall body of work," for example acerbic, campy, cerebral, hypnotic, rollicking, rustic, silly, and sleazy. While AMG never explicitly defines them, styles are subgenre categories such as "Punk-Pop," "Prog-Rock/Art Rock," and "Speed Metal." In the experiment, styles and moods that included 50 or more songs, which amounted to 32 styles and 100 moods, were used. Referring to FIG. 5, a list of the most popular moods and styles, and corresponding songs, are displayed.

While AMG, in general, only assigns moods and styles to albums and artists, for the purposes of testing, it was assumed that all of the songs on an album had the same moods and styles, namely those attributed to that album, though this assumption does not necessarily hold, for example, with a ballad on an otherwise upbeat album.

Artist identification is the task of identifying the performer of a song given only the audio of that song. While a song can have many styles and moods, it can have only one artist, making this the ground truth of choice for an N-way classification test of the various feature sets.

Before beginning the experiment, the SVM parameters $\gamma$ and C, the weighting used to trade-off between classifier margin and margin violations for particular points, which are more efficiently treated as mislabeled via the so-called "slack variables," needed to be set. Simple cross-validation grid search was used to find well-performing values. These results were not exhaustively compared for all combinations of features and ground truth, but only a representative sample. After normalizing all feature columns to be zero mean and unit variance, the best performing classifiers used C=104 and $\gamma$=0.01, although other suitable values could also have been used. Settings widely divergent from these tended to generate uninformative classifiers that labeled everything as a negative result.

The experiment compared different sized training sets in each round of active learning on the best-performing features, MFCC Statistics. Active learning should be able to achieve the same accuracy as passive learning with fewer labeled examples because it chooses more informative examples to be labeled first. To measure performance, the mean precision on the top 20 results on unlabeled songs on the test set containing completely different albums were compared.

In this experiment, five different training group sizes were compared. In each trial, an active learning system was randomly seeded with 5 elements from within the class, corresponding to a user supplying songs that they would like the results to be similar to. The system then performed simulated relevance feedback with 2, 5, 10, and 20 songs per round, and one round with 50 songs, the latter of which is equivalent to conventional SVM learning. The simulations stopped once the learner had labeled 50 results so that the different training sets could be compared.

Figure 6A:
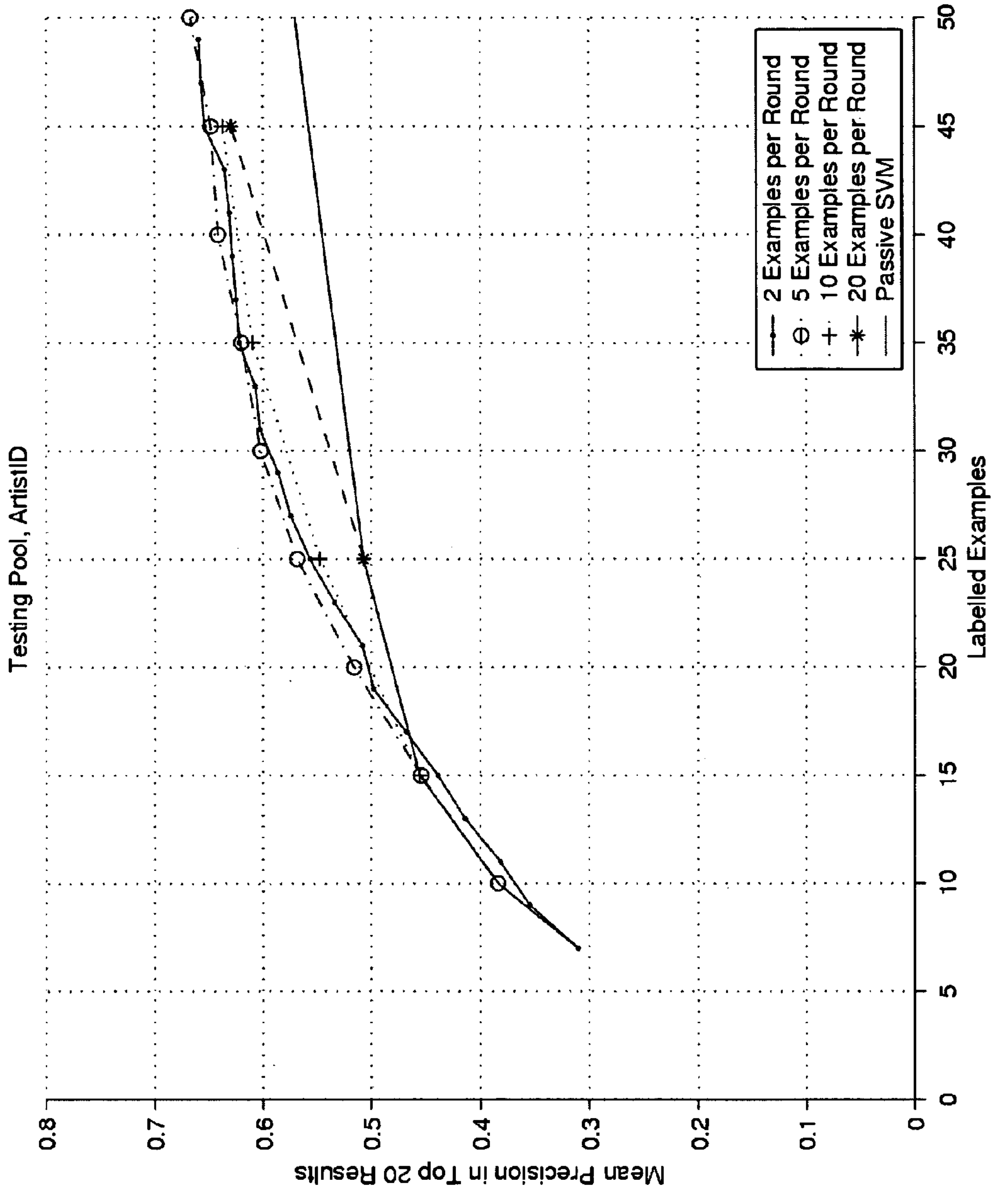
Figure 6B:
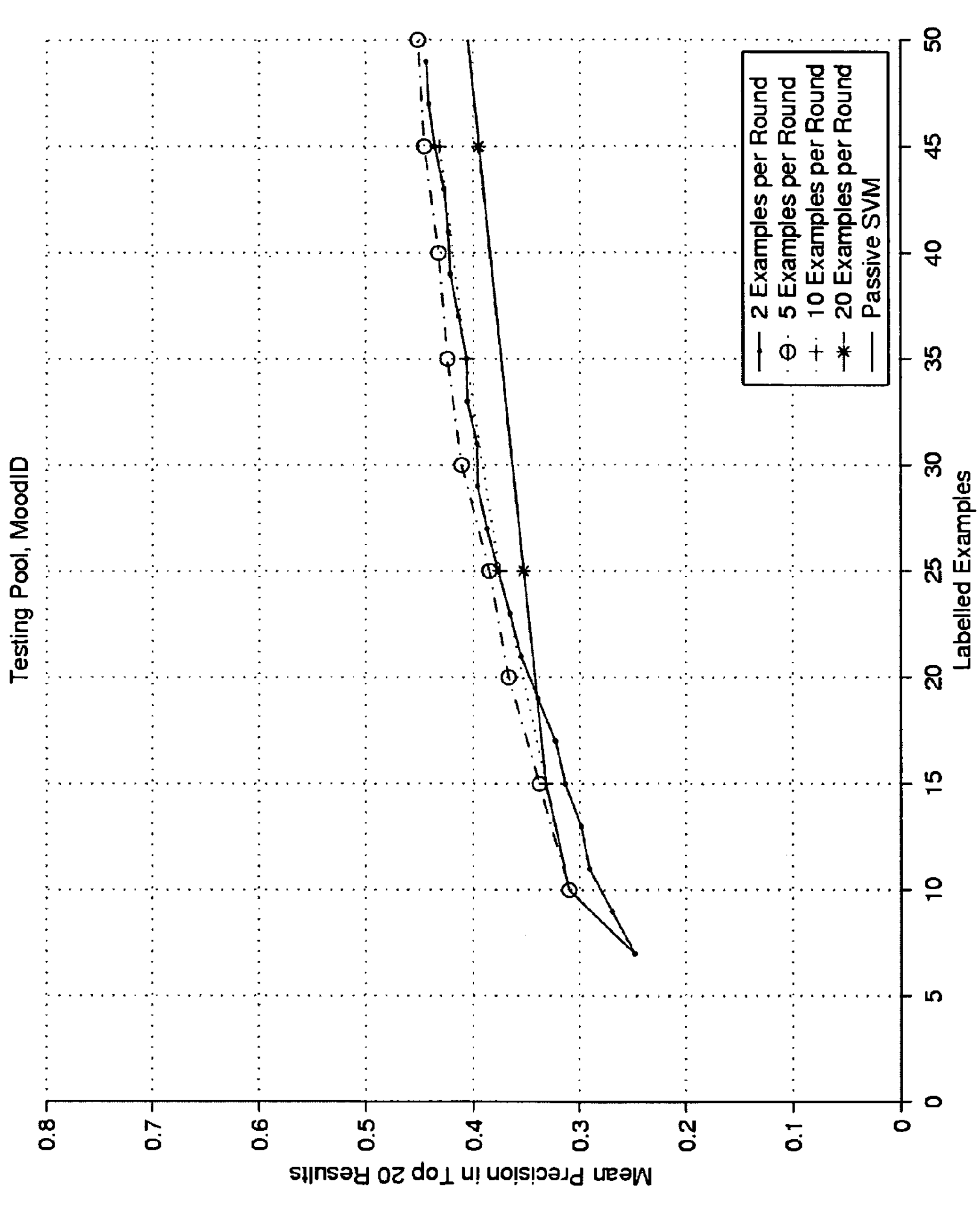
Figure 6C:
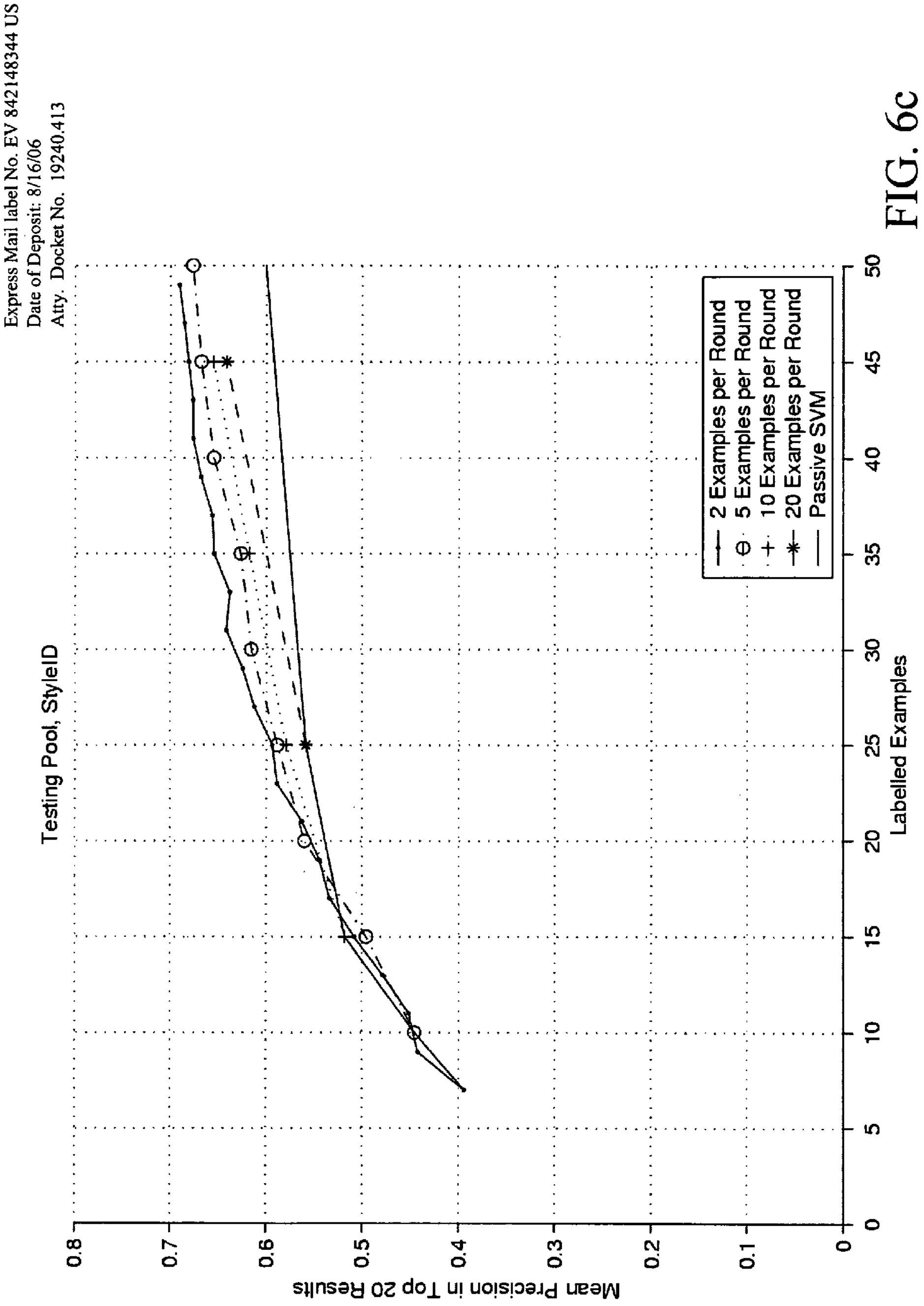

The results of the active retrieval experiments can be seen in FIGS. 6*a-c*. The figures show that, as expected, the quality of the classifier depends heavily on the number of rounds of relevance feedback, not only on the absolute number of labeled examples. Specifically, a larger number of re-trainings with fewer new labels elicited per cycle leads to a better classifier, since there are more opportunities for the system to choose the examples that will be most helpful in refining the classifier. This shows the power of active learning to select informative examples for labeling. Notice that the classifiers all perform at about the same precision below 15 labeled examples, with the smaller examples-per-round systems actually performing worse than the larger ones. Since the learning system is seeded with five positive examples, it can take the smaller sample size systems a few rounds of feedback before a reasonable model of the negative examples can be built.

Comparing the ground truth sets to one another, it appears that the system performs best on the style identification task, achieving a maximum mean precision-at-20 of 0.683 on the test set, only slightly worse than the conventional SVM trained on the entire training set which requires more than 13 times as many labels. See FIG. 8 for a full listing of the precision-at-20 of all of the classifiers on all of the datasets after labeling 50 examples. On all of the ground truth sets, the active learning system can achieve the same mean precision-at-20 with only 20 labeled examples that a conventional SVM achieves with 50.

As expected, labeling more songs per round suffers from diminishing returns; performance depends most heavily on the number of rounds of active learning instead of the number of labeled examples. This result is a product of the suboptimal division of the version space when labeling multiple data points simultaneously.

Opposing the use of small training sets, however, is the initial lack of negative examples. Using few training examples per round of feedback can actually hurt performance initially because the classifier has trouble identifying examples that would be most discriminative to label. It might be advantageous, then, to begin training on a larger number of examples perhaps just for the "special" first round and then, once enough negative examples have been found, to reduce the size of the training sets in order to increase the speed of learning.

In some embodiments, music classification techniques, such as SVM active learning, can be integrated with current music players to automatically generate playlists. Such an embodiment is illustrated in FIG. 8. As shown, a playlist can automatically be generated in a window 814, and buttons 802, 804, 806, 808, 810, and 812 can be provided for seeding the SVM active learner (as described above), for playing a song listed in window 814, for pausing a song being played, for repeating a song being played, for labeling a song as being good, and for labeling a song as being bad, respectively. Instead of being labeled as good and bad, good button 810 can instead be labeled as a rewind (or skip back) button and bad button 812 can be labeled as a fast forward (or skip forward) button. In this way, SVM active learning can be taking place (as described above) without it being obvious to a user. For instance by interpreting the skipping of a song as a negative label for the current search, while interpreting playing a song all the way through as a positive label (depending on whether box 816 is checked), the user might not realize that his actions are being used for classification. In order to train the classifier most effectively, the most desirable results could be interspersed in the list in window 814 with the most discriminative results in a ratio selectable by the user. This system can allow retraining of the classifier between every labeling, converging on the most relevant classifier as quickly as possible.

FIG. 9 is a schematic diagram of an illustrative system 900 suitable for various embodiments. As illustrated, system 900 can include one or more clients 902. Clients 902 can be connected by one or more communications links 904 to a communications network 906. Communications network 906 can also be linked via a communications link 908 to a server 910. It is also possible that a client and a server can be connected via communication links 908 or 904 directly and not through a communication network 906.

In system 900, server 910 can be any suitable server for executing an application, such as a processor, a computer, a data processing device, or a combination of such devices. Communications network 906 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), telephone network, or any combination of any of the same. Communications links 904 and 908 can be any communications links suitable for communicating data between clients 902 and server 910, such as network links, dial-up links, wireless links, hard-wired links, etc. Clients 902 can be personal computers, laptop computers, mainframe computers, Internet browsers, personal digital assistants (PDAs), two-way pagers, wireless terminals, MP3 player, portable or cellular telephones, etc., or any combination of the same. Clients 902 and server 910 can be located at any suitable location. Clients 902 and server 910 can each contain any suitable memory and processors for performing the functions described herein.

In such a client-server architecture, the server could be used for performing the SVM calculations and storing music content, and the client could be used for viewing the output of the SVM, downloading music from the server, purchasing music from the server, etc.

Although a client-server architecture is illustrated in FIG. 9, it should be apparent that some embodiments could be implemented in a single device, such as a laptop computer, an MP3 player, or any other suitable device containing suitable processing and storage capability. Once such device could be a music player, which may take the form of an MP3 player, a CD player, a cell phone, a personal digital assistant, or any other device capable of storing music, playing music, and performing the music classification functions described herein.

Although the present invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow.

What is claimed is:

1. A computer-implemented method of organizing a collection of songs, in a computer system having a processor and memory, the method comprising:

receiving by the processor a selection of at least one seed song;

storing the selection of the at least one seed song to the memory;

receiving by the processor a label selection for at least one unlabeled song in the collection of songs;

training by the processor a support vector machine based at least in part on the at least one seed song and the label selection;

classifying by the processor a first song in the collection of songs using the support vector machine;

generating by the processor a playlist including the classified song; and outputting the playlist to a user.

2. The computer-implemented method of claim 1, further comprising randomly selecting the at least one unlabeled song.

3. The computer-implemented method of claim 2, further comprising determining whether the at least one unlabeled song is being selected for a first round of labeling.

4. The computer-implemented method of claim 1, further comprising selecting as the at least one unlabeled song based upon the training of the support vector machine.

5. The computer-implemented method of claim 1, further comprising playing the classified song.

6. The computer-implemented method of claim 5, wherein the classified song is played on a music player.

7. The computer-implemented method of claim 1, wherein receiving the label selection comprises receiving the label selection as part of the at least one unlabeled song being skipped.

8. The computer-implemented method of claim 1, further comprising transmitting the classified song.

9. The computer-implemented method of claim 1, further comprising selling the classified song.

10. The computer-implemented method of claim 1, further comprising classifying the song based upon Mel Frequency Cepstral Coefficient statistics.

11. A computer system for organizing a collection of songs, comprising:

memory for storing at least one seed song and the collection of a songs; and a processor that:

receives a selection of the at least one seed song;

receives a label selection for the at least one unlabeled song in the collection of songs;

trains a support vector machine based at least in part on the at least one seed song and the label selection;

classifies a first song in the collection of songs using the support vector machine;

generates a playlist including the classified song; and outputs the playlist to a user.

12. The system of claim 11, wherein the processor also randomly selects the at least one unlabeled song.

13. The system of claim 11, wherein the processor also determines whether the at least one unlabeled song is being selected for a first round of labeling.

14. The system of claim 13, wherein the processor also selects as the at least one unlabeled song based upon the training of the support vector machine.

15. The system of claim 11, wherein the processor also plays the classified song.

16. The system of claim 15, wherein the classified song is played on a music player.

17. The system of claim 11, wherein, in receiving the label selection, the processor also receives the label selection as part of the at least one unlabeled song being skipped.

18. The system of claim 11, wherein the processor also transmits the classified song.

19. The system of claim 11, wherein the processor also sells the classified song.

20. The system of claim 11, wherein the processor also classifies the song based upon Mel Frequency Cepstral Coefficient statistics.

21. A computer-readable medium containing computer-executable instructions that, when executed by a computer, cause the computer to perform a method for organizing a collection of songs, the method comprising:

receiving by a processor a selection of at least one seed song;

storing by the processor the selection of at least one seed song to a memory;

receiving by the processor a label selection for at least one unlabeled song in the collection of songs;

training by the processor a support vector machine to based at least in part on the at least one seed song and the label selection;

classifying by the processor a first song in the collection of songs using the support vector machine;

generating by the processor a playlist including the classified song; and outputting by the processor the playlist to a user.

22. The computer-readable medium of claim 21, wherein the method further comprises randomly selecting the at least one unlabeled song.

23. The computer-readable medium of claim 22, wherein the method further comprises determining whether the at least one unlabeled song is being selected for a first round of labeling.

24. The computer-readable medium of claim 21, wherein the method further comprises selecting as the at least one unlabeled song based upon the training of the support vector machine.

25. The computer-readable medium of claim 21, wherein the method further comprises playing the classified song.

26. The computer-readable medium of claim 25, wherein the classified song is played on a music player.

27. The computer-readable medium of claim 21, wherein receiving the label selection in the method further comprises receiving the label selection as part of the at least one unlabeled song being skipped.

28. The computer-readable medium of claim 21, wherein the method further comprises transmitting the classified song.

29. The computer-readable medium of claim 21, wherein the method further comprises selling the classified song.

30. The computer-readable medium of claim 21, wherein the method further comprises classifying the song based upon Mel Frequency Cepstral Coefficient statistics.

31. A computer-implemented method of organizing a collection of songs, in a computer system having a processor and memory, the method comprising:
 receiving by the processor a selection of at least one seed song;
 storing by the processor the selection of at least one seed song to a memory;
 receiving by the processor a label selection for at least one unlabeled song in the collection of songs;
 training by the processor a support vector machine based at least in part on the at least one seed song stored in the memory and the label selection;
 classifying by the processor a first song in the collection of songs using the support vector machine; and
 outputting by the processor the first song to a user in response to a search performed by the user.

32. The computer-implemented method of claim 31, further comprising randomly selecting the at least one unlabeled song.

33. The computer-implemented method of claim 32, further comprising determining whether the at least one unlabeled song is being selected for a first round of labeling.

34. The computer-implemented method of claim 31, further comprising selecting as the at least one unlabeled song based upon the training of the support vector machine.

35. The computer-implemented method of claim 31, further comprising playing the classified song.

36. The computer-implemented method of claim 31, wherein receiving the label selection comprises receiving the label selection as part of the at least one unlabeled song being skipped.

37. The computer-implemented method of claim 31, further comprising classifying the song based upon Mel Frequency Cepstral Coefficient statistics.

38. A computer system for organizing a collection of songs, comprising:
 memory for storing at least one seed song, and the collection of songs; and
 a processor that:
  receives a selection of the at least one seed song;
  receives a label selection for the at least one unlabeled song in the collection of songs;
  trains a support vector machine based at least in part on the at least one seed song and the label selection;
  determines a classification for a first song using the support vector machine; and
  outputs the first song to a user in response to a search performed by the user.

39. The system of claim 38, wherein the processor also randomly selects the at least one unlabeled song.

40. The system of claim 39, wherein the processor also determines whether the at least one unlabeled song is being selected for a first round of labeling.

41. The system of claim 38, wherein the processor also selects as the at least one unlabeled song based upon the training of the support vector machine.

42. The system of claim 38, wherein the processor also plays the classified song.

43. The system of claim 38, wherein, in receiving the label selection, the processor also receives the label selection as part of the at least one unlabeled song being skipped.

44. The system of claim 38, wherein the processor also classifies the song based upon Mel Frequency Cepstral Coefficient statistics.

45. A computer-readable medium containing computer-executable instructions that, when executed by a computer, cause the computer to perform a method for organizing a collection of songs, the method comprising:
 receiving by a processor a selection of at least one seed song;
 storing by the processor the selection of at least one seed song to a memory;
 receiving by the processor a label selection for at least one unlabeled song in the collection of songs;
 training by the processor a support vector machine to based at least in part on the at least one seed song and the label selection;
 classifying by the processor a first song in the collection of songs using the support vector machine; and
 outputting by the processor the first song to a user in response to a search performed by the user.

46. The computer-readable medium of claim 45, wherein the method further comprises randomly selecting the at least one unlabeled song.

47. The computer-readable medium of claim 46, wherein the method further comprises determining whether the at least one unlabeled song is being selected for a first round of labeling.

48. The computer-readable medium of claim 45, wherein the method further comprises selecting as the at least one unlabeled song based upon the training of the support vector machine.

49. The computer-readable medium of claim 45, wherein the method further comprises playing the classified song.

50. The computer-readable medium of claim 45, wherein receiving the label selection in the method further comprises receiving the label selection as part of the at least one unlabeled song being skipped.

51. The computer-readable medium of claim 45, wherein the method further comprises classifying the song based upon Mel Frequency Cepstral Coefficient statistics.

* * * * *